United States Patent
Kanungo et al.

(10) Patent No.: US 12,536,993 B2
(45) Date of Patent: Jan. 27, 2026

(54) SYSTEM AND METHOD FOR POST-ASR FALSE WAKE-UP SUPPRESSION

(71) Applicant: Samsung Electronics Co., Ltd., Suwon-si (KR)

(72) Inventors: Tapas Kanungo, Redmond, WA (US); Preeti Saraswat, Santa Clara, CA (US); Stephen Michael Walsh, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 224 days.

(21) Appl. No.: 18/328,343

(22) Filed: Jun. 2, 2023

(65) Prior Publication Data

US 2024/0119925 A1   Apr. 11, 2024

Related U.S. Application Data

(60) Provisional application No. 63/414,648, filed on Oct. 10, 2022.

(51) Int. Cl.
  *G10L 15/08*   (2006.01)
(52) U.S. Cl.
  CPC ........ *G10L 15/08* (2013.01); *G10L 2015/088* (2013.01)
(58) Field of Classification Search
  CPC .......................... G10L 15/08; G10L 2015/088
  See application file for complete search history.

(56) References Cited

U.S. PATENT DOCUMENTS 9,418,656 B2 *   8/2016   Foerster .................. G10L 15/22
9,697,828 B1 *   7/2017   Prasad ..................... G10L 15/08
(Continued)

FOREIGN PATENT DOCUMENTS

CN    112002317 A    11/2020
CN    114360522 B    8/2022
(Continued)

OTHER PUBLICATIONS

Devlin, Jacob, et al. "Bert: Pre-training of deep bidirectional transformers for language understanding." Proceedings of the 2019 conference of the North American chapter of the association for computational linguistics: human language technologies, vol. 1 (long and short papers). 2019. (Year: 2019).*

(Continued)

*Primary Examiner* — Brian L Albertalli

(57) ABSTRACT

A method includes obtaining a speech signal. The method also includes predicting a first likelihood of a wake word or phrase being spoken in the speech signal using a first machine learning model trained to receive the speech signal as input. The method further includes, responsive to the first likelihood exceeding a first threshold, performing automatic speech recognition on the speech signal to determine a textual representation of the speech signal. The method also includes predicting a second likelihood of the wake word or phrase being spoken in the speech signal using a second machine learning model trained to receive at least one of the textual representation, audio features associated with the speech signal, and context features associated with the electronic device. In addition, the method includes, responsive to the second likelihood exceeding a second threshold, generating instructions to perform an action requested in the speech signal.

20 Claims, 10 Drawing Sheets

(56) References Cited

U.S. PATENT DOCUMENTS

| | | | |
|---|---|---|---|
| 10,510,340 B1* | 12/2019 | Fu | G10L 15/18 |
| 11,195,522 B1 | 12/2021 | Makashir et al. | |
| 11,232,788 B2* | 1/2022 | Yavagal | G10L 17/08 |
| 11,361,763 B1* | 6/2022 | Maas | G10L 15/18 |
| 11,557,293 B2* | 1/2023 | Carbune | G10L 15/22 |
| 11,577,379 B2 | 2/2023 | Kim | |
| 11,721,338 B2* | 8/2023 | Kwatra | G10L 15/22 |
| | | | 704/275 |
| 2018/0012593 A1 | 1/2018 | Prasad et al. | |
| 2018/0233150 A1* | 8/2018 | Gruenstein | G10L 15/30 |
| 2019/0251963 A1 | 8/2019 | Li et al. | |
| 2019/0371325 A1* | 12/2019 | Nakada | B60K 35/656 |
| 2020/0105256 A1* | 4/2020 | Fainberg | G10L 15/30 |
| 2020/0168207 A1 | 5/2020 | Wang et al. | |
| 2021/0104221 A1 | 4/2021 | Sharifi et al. | |
| 2021/0249005 A1* | 8/2021 | Bromand | G10L 21/0208 |
| 2021/0256965 A1 | 8/2021 | Kim et al. | |
| 2022/0020357 A1 | 1/2022 | Rastrow et al. | |
| 2022/0115015 A1* | 4/2022 | Elkhatib | G10L 15/22 |
| 2023/0245648 A1* | 8/2023 | Thyssen | G10L 15/08 |
| | | | 704/251 |
| 2023/0298578 A1* | 9/2023 | Delaney | G06F 40/30 |
| | | | 704/257 |
| 2024/0029736 A1* | 1/2024 | Xiao | G10L 15/32 |
| 2024/0265921 A1* | 8/2024 | Dureau | G10L 15/32 |

FOREIGN PATENT DOCUMENTS

| | | |
|---|---|---|
| CN | 113450771 B | 9/2022 |
| CN | 115064160 A | 9/2022 |
| CN | 115132195 A | 9/2022 |
| KR | 10-2019-0090424 A | 8/2019 |
| KR | 10-2020-0013152 A | 2/2020 |
| KR | 10-2020-0025226 A | 3/2020 |
| KR | 10-2021-0010270 A | 1/2021 |

OTHER PUBLICATIONS

Ho, Tin Kam. "Random decision forests." Proceedings of 3rd international conference on document analysis and recognition. vol. 1. IEEE, 1995. (Year: 1995).*
International Search Report and Written Opinion of the International Searching Authority dated Sep. 20, 2023 in connection with International Patent Application No. PCT/KR2023/008934, 12 pages.
Supplementary European Search Report dated Aug. 19, 2025, in connection with European Application No. 23877426.9, 9 pages.
Gruenstein, et al., "A Cascade Architecture for Keyword Spotting on Moble Devices," arXiv:1712.03603v1 [cs.SD], Dec. 2017, 4 pages.

* cited by examiner

| AUDIO & CONTEXT FEATURES | DERIVED FEATURES |
|---|---|
| nlString | • Bag of Words<br>• Total Word Count<br>• Total Character Count<br>• Unique Word Count<br>• Character Count/audioTime<br>• Stop Word Count<br>. . . |
| backgroundNoiseLevel | |
| audioTime | |
| signal_to_noise_ratio | |
| preITN Text | |
| clientLaunchMethod | |
| gender | |
| handsFree | |
| foregroundAppOrCapsule | |
| . | |
| . | |
| . | |

SYSTEM AND METHOD FOR POST-ASR FALSE WAKE-UP SUPPRESSION

CROSS-REFERENCE TO RELATED APPLICATION AND PRIORITY CLAIM

This application claims priority under 35 U.S.C. § 119(e) to U.S. Provisional Patent Application No. 63/414,648 filed on Oct. 10, 2022, which is hereby incorporated by reference in its entirety.

TECHNICAL FIELD

This disclosure relates generally to machine learning systems. More specifically, this disclosure relates to a system and method for post-automatic speech recognition (ASR) false wake-up suppression.

BACKGROUND

When voice assistants wake up when users do not intend to speak with them, it can lead to a bad user experience and a waste of device resources. False wake ups can also lead to privacy concerns among users. Furthermore, the false wake up problem can be more acute when seamless registration processes that do not ask users for audio training samples are used. Previously, during registration of a device (such as setting up a device after purchasing), users were asked to provide audio training samples of themselves saying a wake word for training a wake-up word detection system. However, users may not wish to provide the audio training samples, so seamless registration has been increasingly implemented instead. Although seamless registration may improve user experience by eliminating a step during registration, the lack of audio training samples may lead to decreased accuracy in the wake-word detection system.

SUMMARY

This disclosure relates to a system and method for post-automatic speech recognition (ASR) false wake-up suppression.

In a first embodiment, a method includes obtaining, by at least one processing device of an electronic device, a speech signal. The method also includes predicting, by the at least one processing device, a first likelihood of a wake word or phrase being spoken in the speech signal using a first machine learning model trained to receive the speech signal as input. The method further includes, responsive to the first likelihood exceeding a first threshold, performing, by the at least one processing device, automatic speech recognition on the speech signal to determine a textual representation of the speech signal. The method also includes predicting, by the at least one processing device, a second likelihood of the wake word or phrase being spoken in the speech signal using a second machine learning model trained to receive at least one of the textual representation, audio features associated with the speech signal, and context features associated with the electronic device. In addition, the method includes, responsive to the second likelihood exceeding a second threshold, generating, by the at least one processing device, instructions to perform an action requested in the speech signal.

In a second embodiment, an electronic device includes at least one processing device configured to obtain a speech signal. The at least one processing device is also configured to predict a first likelihood of a wake word or phrase being spoken in the speech signal using a first machine learning model trained to receive the speech signal as input. The at least one processing device is further configured, responsive to the first likelihood exceeding a first threshold, to perform automatic speech recognition on the speech signal to determine a textual representation of the speech signal. The at least one processing device is also configured to predict a second likelihood of the wake word or phrase being spoken in the speech signal using a second machine learning model trained to receive at least one of the textual representation, audio features associated with the speech signal, and context features associated with the electronic device. In addition, the at least one processing device is configured, responsive to the second likelihood exceeding a second threshold, to generate instructions to perform an action requested in the speech signal.

In a third embodiment, a non-transitory machine readable medium contains instructions that when executed cause at least one processor of an electronic device to obtain a speech signal. The non-transitory machine readable medium also contains instructions that when executed cause the at least one processor to predict a first likelihood of a wake word or phrase being spoken in the speech signal using a first machine learning model trained to receive the speech signal as input. The non-transitory machine readable medium further contains instructions that when executed cause the at least one processor, responsive to the first likelihood exceeding a first threshold, to perform automatic speech recognition on the speech signal to determine a textual representation of the speech signal. The non-transitory machine readable medium also contains instructions that when executed cause the at least one processor to predict a second likelihood of the wake word or phrase being spoken in the speech signal using a second machine learning model trained to receive at least one of the textual representation, audio features associated with the speech signal, and context features associated with the electronic device. In addition, the non-transitory machine readable medium contains instructions that when executed cause the at least one processor, responsive to the second likelihood exceeding a second threshold, to generate instructions to perform an action requested in the speech signal.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
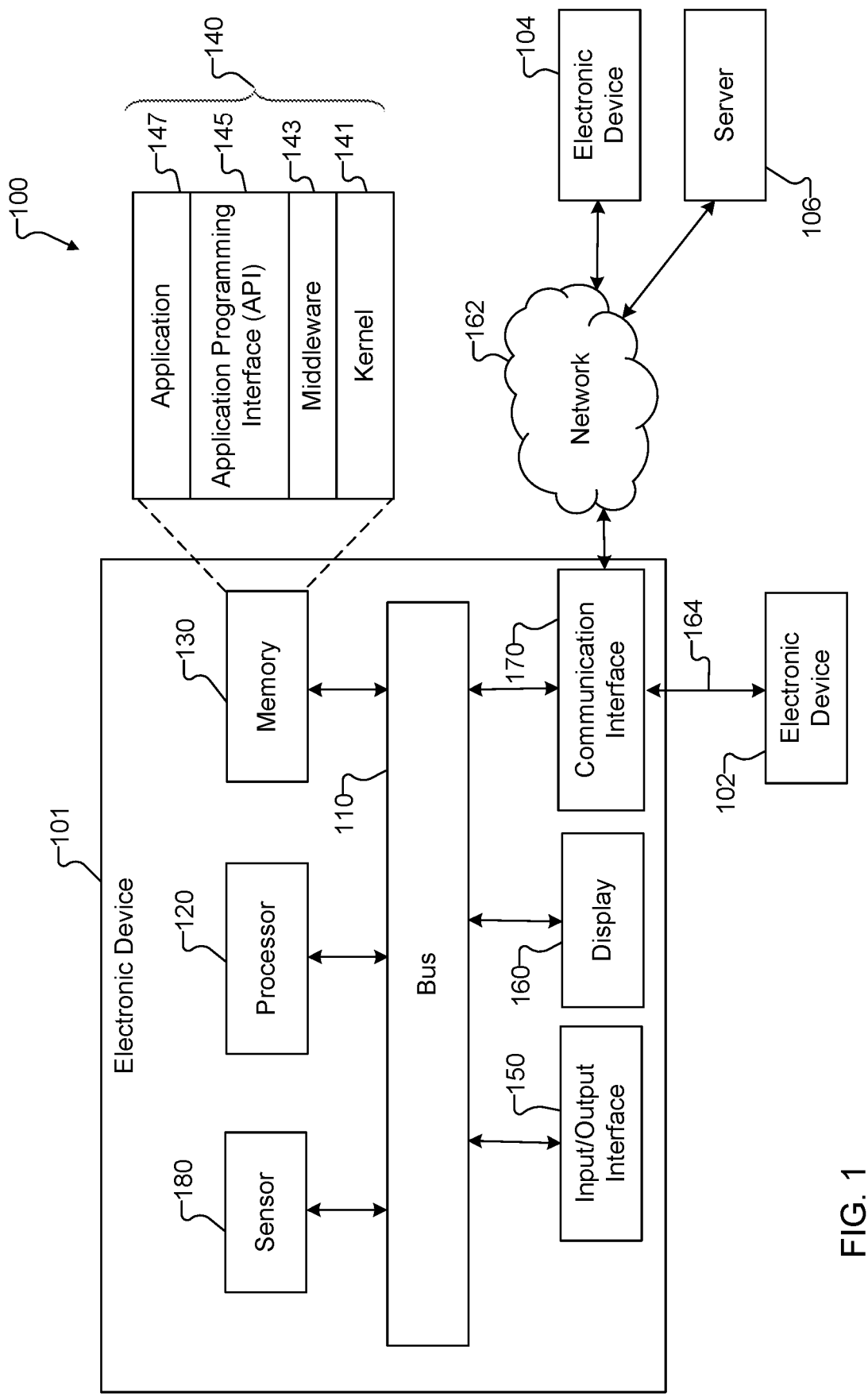
FIG. 1 illustrates an example network configuration including an electronic device in accordance with this disclosure.

FIGS. 1 through 8B, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, when voice assistants, such as BIXBY, SIRI, and ALEXA, wake up when users do not intend to speak with them, it can lead to a bad user experience and a waste of device resources. False wake ups can also lead to privacy concerns among users as users may believe the contents of their utterances are being transmitted over the Internet to other electronic devices. Furthermore, the false wake up problem can be more acute when seamless registration processes that do not ask users for audio training samples are used. Previously, during registration of a device (such as setting up a device after purchasing), users were asked to provide audio training samples of themselves saying a wake word for training a wake-up word detection system. However, users may not wish to provide the audio training samples, so seamless registration has been increasingly implemented instead. Although seamless registration may improve user experience by eliminating a step during registration, the lack of using audio training samples may lead to decreased accuracy in the wake-word detection system.

This disclosure provides various techniques for post-automated speech recognition (ASR) false wake-up suppression that leverage multiple sources of data and use one or more outputs from an ASR model, rather than making the wake-up decision within the first few seconds. By delaying the wake-up decision-making to post-ASR processing, wake-up detection results are drastically improved, possibly up to 93% to 96% or better. In some embodiments, multiple sources of data associated with an audio input are collected, and the multiple sources of data and an ASR text output provided by an ASR model are used to perform a wake-up decision (instead of making the wake-up decision with just the audio data).

As described in this disclosure, this is achieved by implementing a false wake-up suppression model, where the false wake-up suppression model takes outputs from both an audio wake-up classifier model (and any data derived from the outputs of the wake-up classifier model or from the input audio signal) and from an ASR model, as well as context features that provide context for the environment in which the wake-up detection operation is being performed. For example, information derived from the audio signal, the output ASR text from the ASR model, and the client device context can be used to predict the probability of a false wake-up. In various embodiments, a threshold used to determine whether or not there is likely an intended wake-up event can be adjusted to tune the overall system based on prior probability of false and correct wake-up events determined using prior-processed audio signals. As described in this disclosure, in some cases, the false wake-up suppression model can be constructed using a transformer-based language model and a multi-layer perceptron model, a transformer-based language model and a random forest classifier model, or other configurations of machine learning models.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may receive and process inputs (such as audio inputs like speech data or signals received from an audio input device like a microphone) and perform wake word detection and wake-up determination processes using the inputs. This can include using at least a first machine learning model to predict a first likelihood of a wake word being spoken in the inputs and a second machine learning model to predict a second likelihood of the wake word being spoken in the inputs and triggering further action if both likelihoods are above respective thresholds. The processor 120 may also instruct other devices to perform certain operations (such as outputting audio using an audio output device like a speaker) or display content on one or more displays 160. The processor 120 may further receive inputs (such as data samples to be used in training machine learning models) and manage such training by inputting the samples to the machine learning models, receive outputs from the machine learning models, and execute learning functions (such as loss functions) to improve the machine learning models.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications that receive audio data, predict wake words in utterances included in the audio data, perform speech recognition on the utterances, perform false wake-word suppression or verification operations using the audio data, and execute tasks related to the content of the utterances if the false wake-word verification operations are passed. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided.

The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The electronic device 101 further includes one or more sensors 180 that can meter a physical quantity or detect an activation state of the electronic device 101 and convert metered or detected information into an electrical signal. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may receive and process inputs (such as audio inputs like speech data or signals received from an audio input device like a microphone) and perform wake word detection and wake-up determination processes using the inputs. This can include using at least a first machine learning model to predict a first likelihood of a wake word being spoken in the inputs and a second machine learning model to predict a second likelihood of the wake word being spoken in the inputs and triggering further action if both likelihoods are above respective thresholds. The server 106 may also instruct other devices to perform certain operations (such as outputting audio using an audio output device like a speaker) or display content on one or more displays 160. The server 106 may further receive inputs (such as data samples to be used in training machine learning models) and manage such training by inputting the samples to the machine learning models, receive outputs from the machine learning models, and execute learning functions (such as loss functions) to improve the machine learning models.

Although FIG. 1 illustrates one example of a network configuration 100 including an electronic device 101, various changes may be made to FIG. 1. For example, the network configuration 100 could include any suitable number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
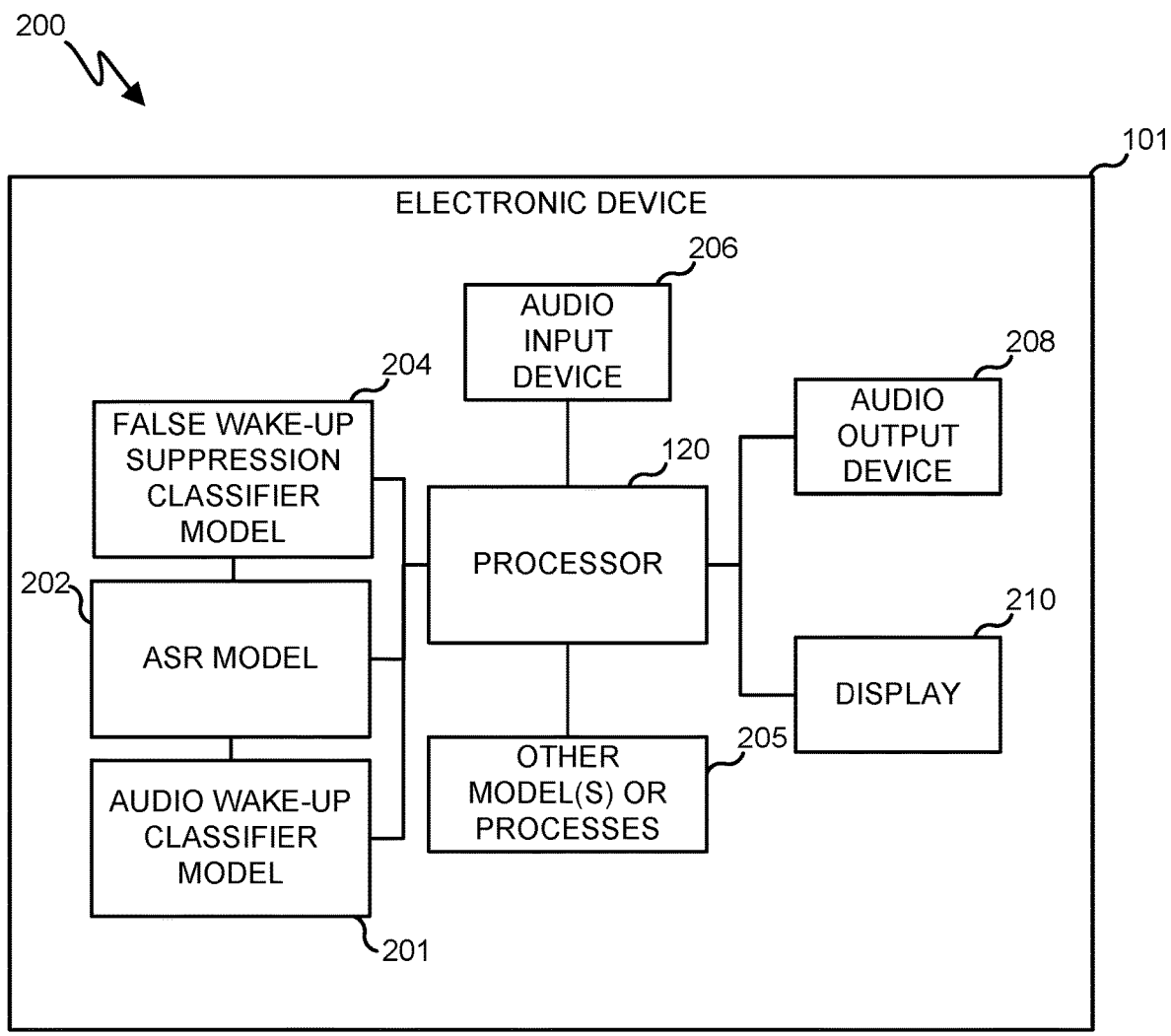
FIG. 2A illustrates an example wake word detection and false-wake word suppression system in accordance with this disclosure.

FIG. 2A illustrates an example wake word detection and false-wake word suppression system 200 in accordance with this disclosure. For ease of explanation, the system 200 is described as involving the use of the electronic device 101 in the network configuration 100 of FIG. 1. However, the system 200 may be used with any other suitable electronic device(s), such as the server 106, and in any other suitable system(s).

As shown in FIG. 2A, the system 200 includes the electronic device 101, which includes the processor 120. The processor 120 is operatively coupled to or otherwise configured to use one or more machine learning models, such as an audio wake-up classifier model 201 (which may include a wake word detector model), an automated speech recognition (ASR) model 202, and a false wake-up suppression classifier model 204. The audio wake-up classifier model 201 can be trained to recognize one or more wake words or phrases and to act as a first gatekeeper in determining whether the electronic device 101 should activate or further use a voice assistant to process and act on received audio data including user requests or commands. The processor 120 can also be operatively coupled to or otherwise configured to use one or more other models 205 or other processes, such as one or more natural language understanding (NLU) models, one or more audio features sourcing processes, one or more context features sourcing processes, one or more command router or routing processes, one or more action plan building processes, etc. It will be understood that the machine learning models 201-205 can be stored in a memory of the electronic device 101 (such as the memory 130) and accessed by the processor 120 to perform automated speech recognition tasks or other tasks. However, the machine learning models 201-205 can be stored in any other suitable manner.

The system 200 also includes an audio input device 206 (such as a microphone), an audio output device 208 (such as a speaker or headphones), and a display 210 (such as a screen or a monitor like the display 160). The processor 120 receives an audio input from the audio input device 206 and provides the audio input to the trained audio wake-up classifier model 201. The trained audio wake-up classifier model 201 detects whether a wake word or phrase is included in an utterance within the audio data and outputs a result to the processor 120, such as one or more predictions or probabilities that the utterance includes the wake word or phrase. If a wake word or phrase is detected, such as based on a determination that a likelihood that the speech signal includes the wake word or phrase is above a specified threshold, the processor 120 provides the audio data to the ASR model 202, which processes the audio data and provides a predicted text output based on the audio data. The processor 120 provides the predicted text output, audio features associated with the input audio data, and context features associated with a particular context or environment in which the wake word detection is being performed to the false wake-up suppression classifier model 204 in order to predict whether the user intended to trigger a wake-up of the voice assistant or not, such as if the utterance was simply a random user utterance.

If the processor 120 determines, using the models 201-204, that the utterance likely includes the wake word or phrase, such as if one or more probabilities is above one or more thresholds, the processor 120 can instruct at least one action of the electronic device 101 or of another device or system. For example, in response to a positive detection of a wake word or phrase, the processor 120 may instruct one or more further actions that correspond to one or more instructions or requests provided in the utterance.

As a particular example, assume an utterance received from a user via the audio input device 206 includes a wake word or phrase (such as "hey BIXBY, call mom"). Here, the trained audio wake-up classifier model 201 detects a first likelihood of the presence of the wake word "BIXBY" or phrase "hey, BIXBY," and the processor 120 determines the first likelihood is above a threshold, which triggers further processing of the utterance. The audio data is provided to the ASR model 202, and the text output from the ASR model and additional audio features and context features are provided to the false wake-up suppression classifier model 204. The false wake-up suppression classifier model 204 provides a second likelihood of the presence of the wake word "BIXBY" or phrase "hey, BIXBY." The processor 120, upon determining that the second likelihood is above a threshold, instructs the audio output device 208 to output "calling Mom." The processor 120 also causes a phone application or other communication application to begin a communication session with a "mom" contact stored on the electronic device 101 or otherwise in association with the user of the electronic device 101.

As another particular example, suppose an utterance of "hey BIXBY, start a timer" is received. The trained audio wake-up classifier model 201 detects a first likelihood of the presence of the wake word "BIXBY" or phrase "hey, BIXBY," and the processor 120 may determine the first likelihood is above a threshold, which triggers further processing of the utterance. The audio data is provided to the ASR model 202, and the text output from the ASR model and additional audio features and context features are provided to the false wake-up suppression classifier model 204. The false wake-up suppression classifier model 204 provides a second likelihood of the presence of the wake word "BIXBY" or phrase "hey, BIXBY." The processor 120 may determine that the second likelihood is above a threshold, and the processor 120 may instruct execution of a timer application and display of a timer on the display 210 of the electronic device 101.

In various embodiments, it will be understood that trained machine learning models, such as the audio wake-up classifier model 201 and the false wake-up suppression classifier model 204, can operate to detect or predict whether a wake word or phrase is in an utterance. Based on that determination, the utterance may or may not be provided to another machine learning model (such as at least one NLU model) for further processing of the utterance in order to recognize the command being given by the user. Also, in various embodiments, based on the domain and/or commands included in the utterance(s), a router can route the processed utterance to different models or sub-assistants associated with the voice assistant and associated with different domains or applications, such as one or more travel domains/applications, one or more music domains/applications, one or more phone domains/applications, etc. Further, in various embodiments, the audio wake-up classifier model 201 and the false wake-up suppression classifier model 204 act as gatekeepers to provide a lightweight solution for detecting if a wake word or phrase is even present in an utterance before committing additional resources to processing the utterance by the electronic device 101.

In addition, it will be understood that the system 200 delays the ultimate wake-up decision-making until after the ASR model 202 processes at least a portion of the audio data, performing wake-up verification using the false wake-up suppression classifier model 204 using outputs from the ASR model 202. By delaying the wake-up decision-making to post-ASR processing, wake-up detection results are drastically improved, such as by over 90%. For example, as described in this disclosure, using deep learning approaches has been found to improve wake-up detection by as much as 96% or more, and using random forest approaches has been found to improve wake-up detection by as much as 93% or more. Additionally, in some embodiments, the system 200, or at least the models 201-204, can be deployed on client electronic devices so that the wake word or phrase detection and wake-up determination processes can be performed on-device without transmitting any data over a public network such as the Internet, which can avoid sending user utterance data to a server 106 or other external destination. This can substantially alleviate user privacy concerns since utterances that do not actually include the wake word or phrase, and thus are not utterances provided by the user with the intention of invoking the voice assistant, are not transmitted or stored outside of the user's electronic device. However, it will be understood that, depending on the particular implementation of the system 200 or based on available computing resources, one or more of the components of the system can be distributed to other devices.

Although FIG. 2A illustrates one example of a wake word detection and false-wake word suppression system 200, various changes may be made to FIG. 2A. For example, the audio input device 206, the audio output device 208, and the display 210 can be connected to the processor 120 within the electronic device 101, such as via wired connections or circuitry. In other embodiments, the audio input device 206, the audio output device 208, and the display 210 can be external to the electronic device 101 and connected via wired or wireless connections. Also, in some cases, the audio wake-up classifier model 201, the ASR model 202, and the false wake-up suppression classifier model 204, as well as one or more of the other machine learning models 205, can be stored as separate models called upon by the processor 120 to perform certain tasks or can be included in and form a part of one or more larger machine learning models.

Figure 2B:
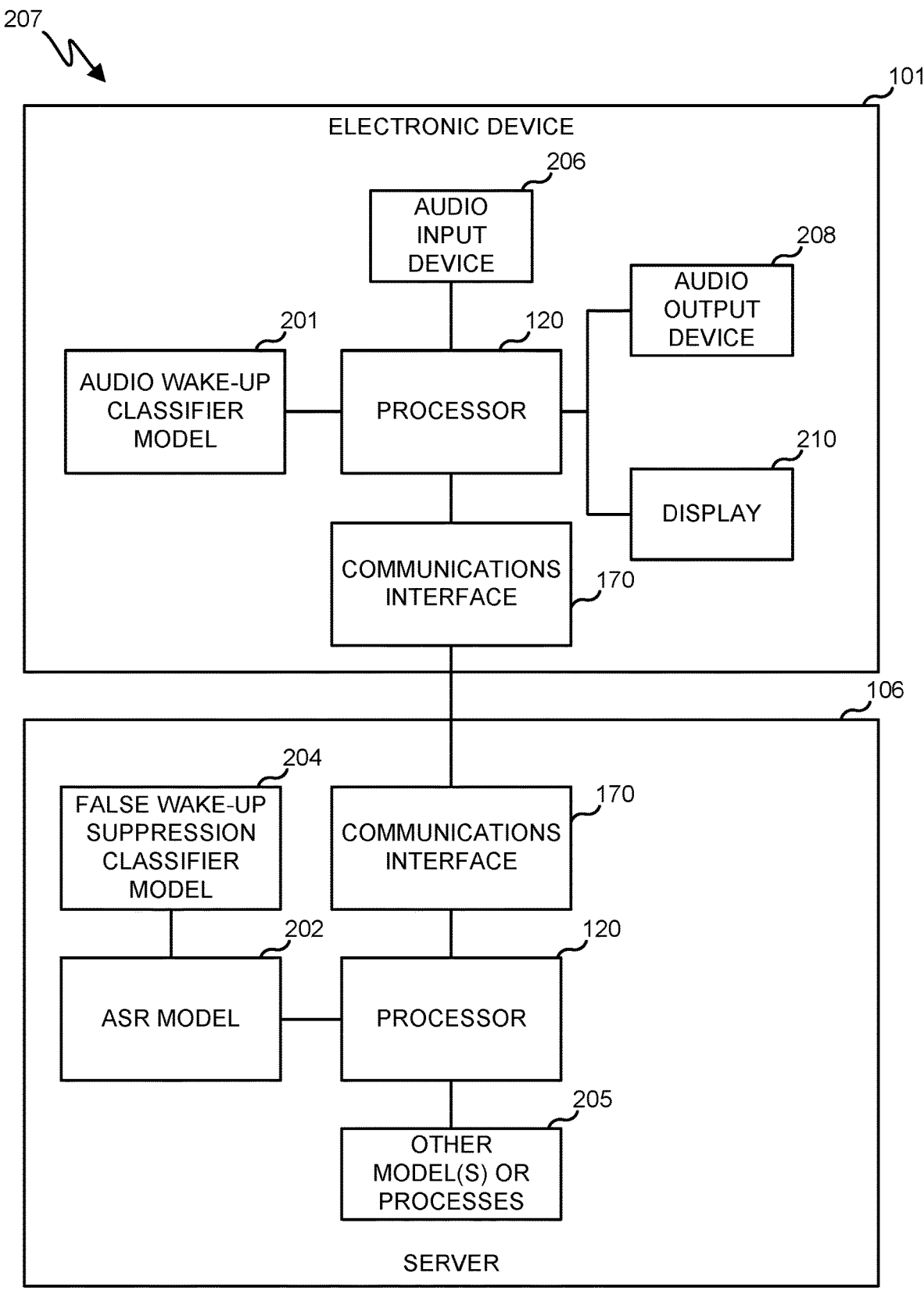
FIG. 2B illustrates an example system in which a false wake-up suppression classifier model is stored on a server in accordance with this disclosure.

Further, in some embodiments, one or more of the machine learning models, such as the ASR model 202, the false wake-up suppression classifier model 204, and one or more of the other machine learning models 205, can be stored remotely from the electronic device 101, such as on the server 106. As a particular example, FIG. 2B illustrates an example system 207 in which the ASR model 202, the false wake-up suppression classifier model 204, and the other machine learning models 205 are stored on the server 106 in accordance with this disclosure. Here, the electronic device 101 can transmit requests including inputs like captured audio data, such as by using the communications interface 170, to the server 106, which includes its own processor 120 and communications interface 170 for processing of the inputs using the machine learning models 202, 204, 205. The results provided by the machine learning models 202, 204, 205 can be sent back to the electronic device 101. In some embodiments, the electronic device 101 can be replaced by the server 106, which receives audio inputs from a client device and transmits instructions back to the client device to execute functions associated with instructions included in utterances.

Figure 3:
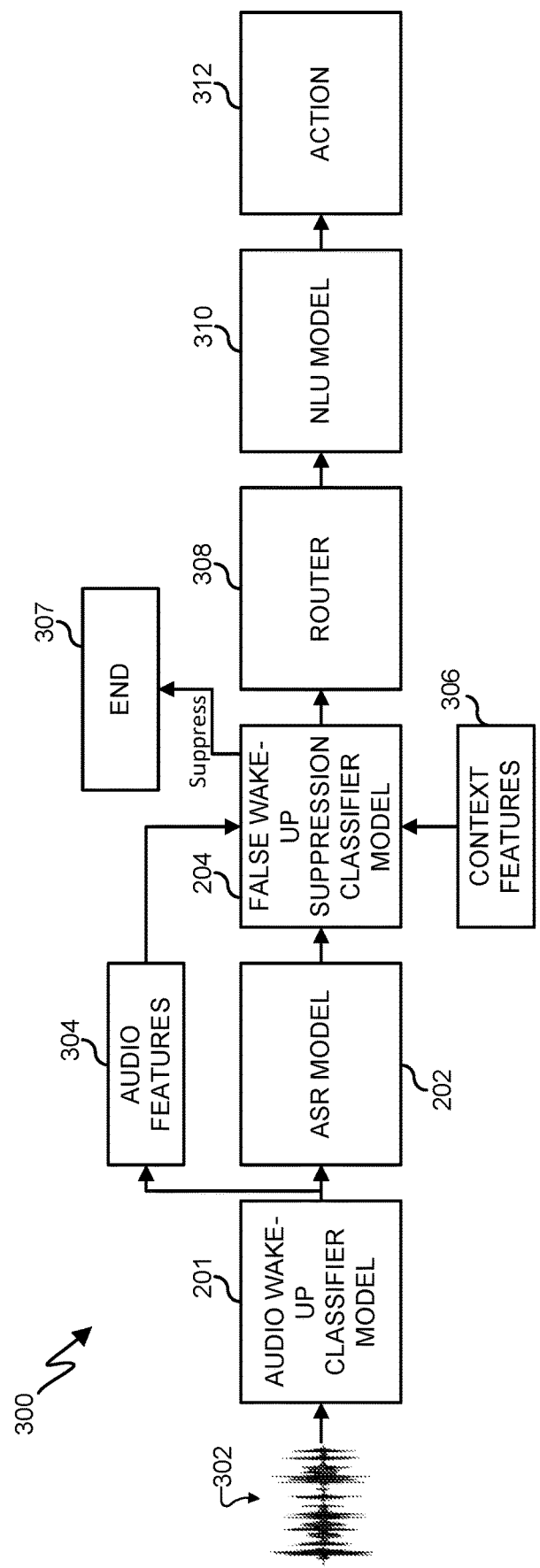
FIG. 3 illustrates an example wake-up verification process in accordance with this disclosure.

FIG. 3 illustrates an example wake-up verification process 300 in accordance with this disclosure. For ease of explanation, the process 300 is described as involving the use of the electronic device 101 and its associated processor 120 in the network configuration 100 of FIG. 1. However, the process 300 may be used with any other suitable electronic device (such as the server 106) or a combination of electronic devices (such as the electronic device 101 and the server 106) and in any other suitable system(s).

As shown in FIG. 3, the process 300 includes a first machine learning model (the audio wake-up classifier model 201) receiving an audio signal 302, such as a signal received via an audio input device like the audio input device 206. The audio wake-up classifier model 201 is trained to determine a first likelihood or probability that the audio signal 302 is a user utterance including a particular wake word or phrase. If the processor 120 determines that the first likelihood is at or above a specified threshold, such as 0.5 or 50%, the audio signal 302 is provided to the ASR model 202. The audio wake-up classifier model 201 is thus used as a preliminary gatekeeper for invoking the wake-up procedure of the voice assistant. As such, if the first likelihood is below the threshold, the process 300 will end.

The ASR model 202 processes the audio signal 302 and outputs at least a text output for further processing. The text output is provided to a second machine learning model (the false wake-up suppression classifier model 204). As shown in FIG. 3, the false wake-up suppression classifier model 204 is included after the ASR model 202. The process 300, using the novel false wake-up suppression classifier model 204, is used to detect and suppress false wake-up events post-ASR. The false wake-up suppression classifier model 204 is a classifier that detects if a natural language (NL) string, which can include or be a portion of the ASR text output provided by the ASR model 202, is from an unintentional or intentional wake-up. Here, the process 300 leverages the ASR text output to predict the probability of a false wake-up. The false wake-up suppression classifier model 204 also can receive audio features 304 and context features 306 as inputs to enhance the ability to detect a false wake-up and suppress further action. The false wake-up suppression classifier model 204 can output a second likelihood or probability that the audio signal 302 includes an utterance with a wake word or phrase using the additional inputs as modifiers and/or constraints in performing the classification.

Figures 4A, 4B:
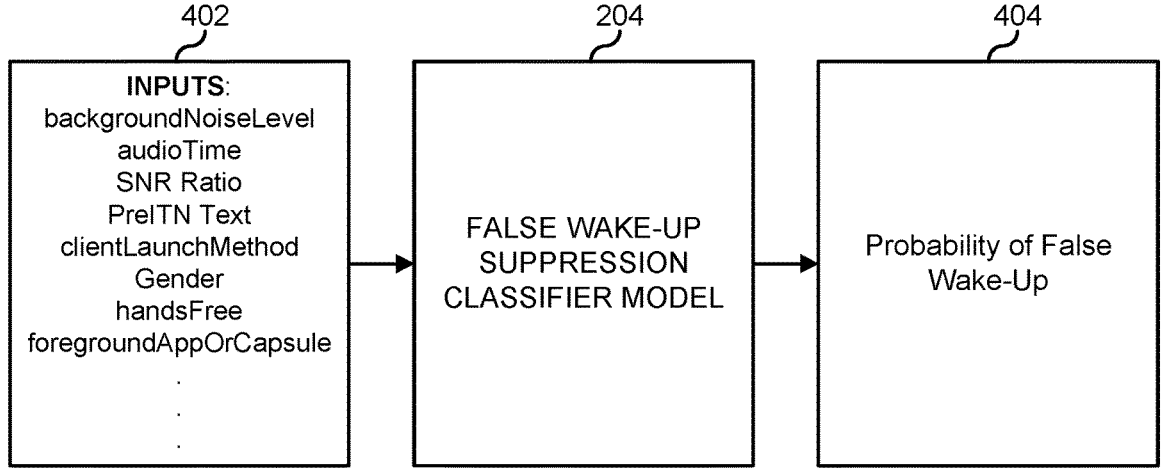
FIG. 4A illustrates example audio and context input features in accordance with this disclosure.
FIG. 4B illustrates an example audio and context features input process in accordance with this disclosure.

As an example, FIG. 4A illustrates example audio and context input features 400 that can be used by the false wake-up suppression classifier model 204 to determine the likelihood that a wake word or phrase is included in the audio signal 302. As shown in FIG. 4A, features 400 include audio and context features that can be provided as inputs to the false wake-up suppression classifier model 204. The audio features (such as audio features 304) can include the natural language string from the ASR model 202. Additional input features derived from the natural language string can also be used as audio feature inputs to the false wake-up suppression classifier model 204, such as a bag of words input, a total word count input, a total character count input, a unique word count input, a character count-to-audio time ratio, a stop word count, etc. The audio features 304 can also include features based on the audio signal 302, such as a background noise level, an audio time (like in seconds or milliseconds), a signal-to-noise ratio, pre-inverse text normalization (Pre-ITN) data, etc. The features 400 can additionally or alternatively include context features (such as context features 306) that are non-audio signal context information associated with or obtained from the client electronic device. As shown in FIG. 4A, the context features 306 can include a client launch method (how the assistant is activated, such as via button, voice, etc.), the current foreground application or capsule running on the electronic device, the gender of the user, whether the device is operating in a hands-free mode, etc.

As shown in FIG. 4B, which illustrates an example audio and context features input process 401 in accordance with this disclosure, the audio features and context features can be provided as a set of inputs 402 to the false wake-up suppression classifier model 204. Including the false wake-up suppression classifier model 204 after the ASR model 202 allows for the audio wake-up classifier model 201 to retain its normal functionality in acting as initial gatekeeper to detect whether the audio signal 302 likely included an utterance intending to initiate a device wake-up. Using the set of inputs 402, the false wake-up suppression classifier model 204 can verify whether a wake-up event has indeed occurred (the wake-up was likely intentional) or whether the wake-up even should be suppressed (the wake-up was likely unintentional). The false wake-up suppression classifier model 204 can output a probability 404 indicating whether the wake-up event initially detected by the audio wake-up classifier model 201 was a false wake-up event, which can be compared to a threshold to either suppress the wake-up event or move forward with further voice assistant processes. Use of the false wake-up suppression classifier model 204 can enhance user experience, avoid transmission to another electronic device of an unintended utterance, and/or reduce resource consumption such as consumption of battery or computational resources.

As a particular example, in various embodiments, the false wake-up suppression classifier model 204 is trained using a labeled dataset of audio signals that is split into training and test sets. The labeled dataset may be used to train a machine learning model of the false wake-up suppression classifier model 204 (such as a random forest model, a multi-layer perceptron model, and/or a deep learned transformer model (such as Bidirectional Encoder Representations from Transformers (BERT))) to predict false wake-ups. During the inference process, the false wake-up suppression classifier model 204 may be deployed at either an inference server to process inputs transmitted by a client device or may be deployed at a client device (such as a phone, tablet, or computer) to increase user privacy and/or decrease response time. The false wake-up suppression classifier model 204 may output a probability score, such as a score between zero and one (with higher scores indicating a likelihood that the wake-up event was valid) for comparison to the threshold value to predict false wake-ups.

The threshold can also be adjusted to tune the overall system to a prior probability of false and correct wake-ups.

For instance, in some embodiments, the threshold value may be adjusted based on performance of the audio wake-up classifier model 201. For example, if the audio wake-up classifier has a low accuracy determined based on previous wake-up predictions, the threshold for the false wake-up suppression classifier model 204 may be adjusted so that the false wake-up suppression classifier model 204 is able to catch the false wake-up that was missed by the audio wake-up classifier. In some embodiments, the false wake-up suppression classifier model 204 can be trained for different types of audio background noises, and the threshold can be preset for a particular environment. For instance, the false wake-up suppression classifier model 204 may be trained to recognize that the user and the electronic device are currently in a vehicle based on road noise, wind noise, or other sounds present in the audio signal 302. The threshold may be set lower in response (such as by lowering a 0.5 probability threshold to a 0.3 probability threshold) to make it more likely that the output probability 404 will exceed the threshold and trigger further voice assistant processing of the utterance, since it may be more likely that a user in a vehicle wishes to activate a voice assistant to maintain usability of the user's hands. Context features can also be used to reinforce this determination, such as if a global positioning system (GPS) application or other navigation application indicates that the device is moving at a rate or speed commensurate with a vehicle.

As another particular example, the false wake-up suppression classifier model 204 may be trained to recognize that the user and the electronic device are currently in a crowded area, such as an airport, restaurant, etc., based on an amount of background chatter or other sounds in the audio signal 302. Here, the threshold may be set higher in response (such as by increasing a 0.5 probability threshold to a 0.7 probability threshold) to make it less likely that the output probability 404 will exceed the threshold and suppress further voice assistant processing of the utterance, since the background noise can increase the likelihood that a false wake detection was triggered based on an utterance in the background noise and not the user's utterance. Overall background noise level can also play a similar role, such as when high background noise levels cause an increase in the threshold and low background noise levels cause a decrease in the threshold.

Referring again to FIG. 3, based on the output threshold from the false wake-up suppression classifier model 204, the wake-up event can be suppressed, and the process 300 ends at step 307. If, however, the output probability exceeds the threshold, further voice assistant processing can be performed. For example, a router 308 can receive at least the output from the ASR model 202 and route the processed utterance to different models associated with the voice assistant and associated with different domains or applications, such as one or more travel domains/applications, one or more music domains/applications, one or more phone domains/applications, etc. Based on the routing, the utterance may be provided to at least one NLU model 310 that is trained to recognize and perform the domain-specific actions. The NLU model 310 can further process the utterance in order to recognize the command being given by the user and perform or trigger an action 312 based on the command, such as by performing navigation to a particular location using a navigation application, playing a song selection using a music player application, starting a timer using a timer application, etc.

Although FIG. 3 illustrates one example of a wake-up verification process 300, various changes may be made to FIG. 3. For example, various components and functions in FIG. 3 may be combined, further subdivided, replicated, rearranged, or omitted according to particular needs. Also, one or more additional components and functions may be included if needed or desired. Additionally, while shown as a series of steps, various steps in FIG. 3 could overlap, occur in parallel, occur in a different order, or occur any number of times. In some embodiments, the process 300 can be implemented by one electronic device, such as a client device, or the process 300 may also be performed using a distributed architecture. For instance, the audio wake-up classifier model 201, the ASR model 202, and the false wake-up suppression classifier model 204 can be executed on a client electronic device (such as electronic device 101) or at a server (such as server 106). When deployed on a client electronic device, one or more of the models may be compressed using quantization, weight pruning, or other techniques. While executing the models 201-204 on the client electronic device can reduce privacy concerns and can result in quicker response times, the models 201-204 can be executed on a server or other remote electronic device in some embodiments based on available resources.

In various embodiments, the router 308 and NLU model 310 can also be executed by the client electronic device or by the server. When executed by the server, the server may provide the client electronic device with the determined action(s) 312 to be performed by the client electronic device. Also, the action 312 can be performed by the client electronic device, or another electronic device (such as an external display, speaker, etc.) could be instructed to perform the action. In some embodiments, wake-up classification performed by the audio wake-up classifier model 201 can be performed by the client electronic device, and the client electronic device can provide audio signal 302 received via an audio input device of the client electronic device to the server. The ASR model 202, the false wake-up suppression classifier model 204, the router 308, and/or NLU model 310 can be executed by the server based on the audio data provided from the client electronic device.

Additionally, in some embodiments, the process 300 and its associated architecture may be implemented for any language. In some embodiments, the false wake-up suppression classifier model 204 can predict a false wake-up before the ASR model 202 finishes a full ASR. For example, the ASR model 202 can provide a real-time stream of text data as it processes the audio signal 302, and the false wake-up suppression classifier model 204 can provide a probability based on a partial ASR output. Also, in some embodiments, continuous adaptation may be performed on the false wake-up suppression classifier model 204. For example, verified heuristics can be used to continuously identify correct wake-up and false wake-up utterances after the system has been deployed. Training data can be augmented with samples from the new data and used to retrain the false wake-up suppression classifier model 204 using the augmented training data.

Although FIGS. 4A and 4B illustrate example audio and context input features 400 and an example audio and context features input process 401, respectively, various changes may be made to FIGS. 4A and 4B. For example, various components and functions in FIGS. 4A and 4B may be combined, further subdivided, replicated, rearranged, or omitted according to particular needs. Also, one or more additional components and functions may be included if needed or desired. As a particular example, all of the audio and context features shown in FIGS. 4A and 4B could be provided to the false wake-up suppression classifier model 204 or a subset of the audio and context features could be provided, such as based on predetermined settings or dynamically based on current conditions. For instance, continuous learning may show that certain audio and context features or a combination of certain features provides more accurate results, such as if features like signal-to-noise ratio, total character count, audio time, client launch method, and character count-to-audio time features are found to provide more optimal results or probability predictions.

Figure 5:
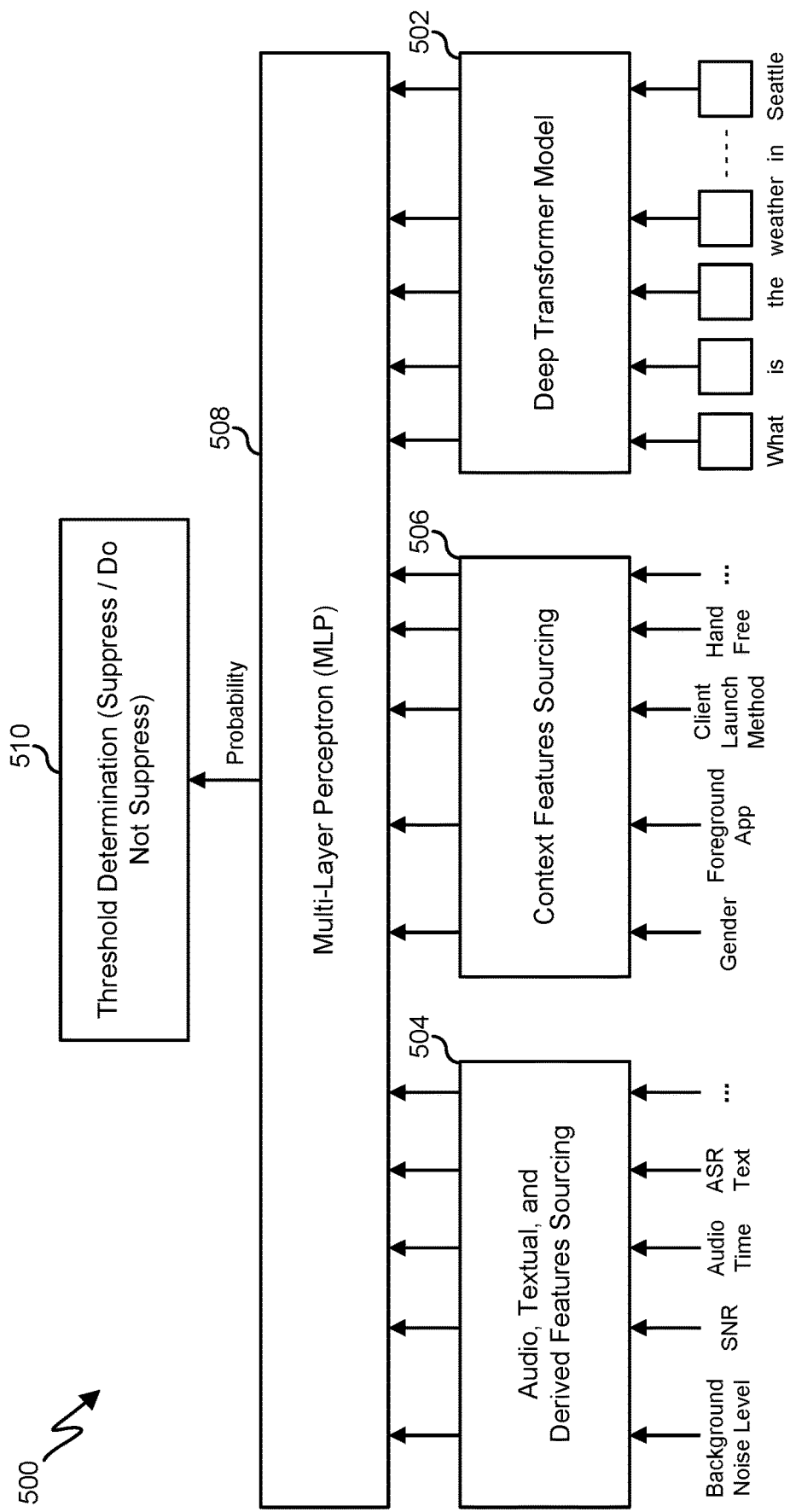
FIG. 5 illustrates an example false wake-up suppression classifier model architecture in accordance with this disclosure.

FIG. 5 illustrates an example false wake-up suppression classifier model architecture 500 in accordance with this disclosure. For ease of explanation, the architecture 500 shown in FIG. 5 is described as being implemented on or supported by the electronic device 101 in the network configuration 100 of FIG. 1. However, the architecture 500 shown in FIG. 5 could be used with any other suitable device(s) and in any other suitable system(s), such as when the architecture 500 is implemented on or supported by the server 106.

As shown in FIG. 5, the architecture 500 includes a deep transformer language model 502, such as a BERT model, that receives as an input a text string provided by an ASR model and that corresponds to an input audio signal. The deep transformer language model 502 is trained to assist with providing meaning for language in text using surrounding text to establish context. Deep transformer language models can connect every output element to every input element, and weightings between them can be dynamically calculated based on their connections. In embodiments in which the deep transformer language model 502 is a BERT model, the input text can be processed bidirectionally, meaning it can be read in both directions at once, and is used to perform natural language understanding using the text input. In this example, the deep transformer language model 502 provides outputs to a multi-layer perceptron 508. The multi-layer perceptron 508 is used to ultimately provide a probability whether an utterance should trigger wake-up procedures or whether wake-up procedures should be suppressed.

In addition to the output received from the deep transformer language model 502, the multi-layer perceptron 508 can receive both audio features and context features. An audio, textual, and derived features sourcing operation 504 collects a plurality of audio features based on or derived from the audio signal and the ASR text, such as an audio time, a signal-to-noise ratio, a background noise level, and other audio features like those described with respect to FIGS. 4A and 4B. In various embodiments, the audio, textual, and derived features sourcing operation 504 can encode these audio features and provide them as additional inputs to the multi-layer perceptron 508. Additionally, sourced audio features such as particular background noises detected in the audio signal may be used to adjust the probability threshold for wake-up suppression.

Additionally or alternatively, a context features sourcing operation 506 can collect a plurality of context information, such as user gender, a foreground application identification, a client launch method, a hands-free setting, or other context information like those described with respect to FIGS. 4A and 4B. In various embodiments, the context features sourcing operation 506 can encode the context features and provide them as additional inputs to the multi-layer perceptron 508. It will be understood that the multi-layer perceptron 508 includes a plurality of layers including an input layer, intermediate layers or weighting layers, and an output layer that provides a final probability regarding whether a wake-up is valid. Based on the output probability, a threshold determination operation 510 determines whether the probability output by the multi-layer perceptron 508 exceeds the threshold. If not, wake-up procedures are suppressed. If so, wake-up procedures are allowed to continue so that the audio input can be further processed for domain/intent detection in order to trigger one or more actions by one or more electronic devices.

Although FIG. 5 illustrates one example of a false wake-up suppression classifier model architecture 500, various changes may be made to FIG. 5. For example, various components and functions in FIG. 5 may be combined, further subdivided, replicated, rearranged, or omitted according to particular needs. Also, one or more additional components and functions may be included if needed or desired. In addition, it will be understood that various types of deep transformer models can be used and that various other types of classification models can be used without departing from the scope of this disclosure.

Figure 6:
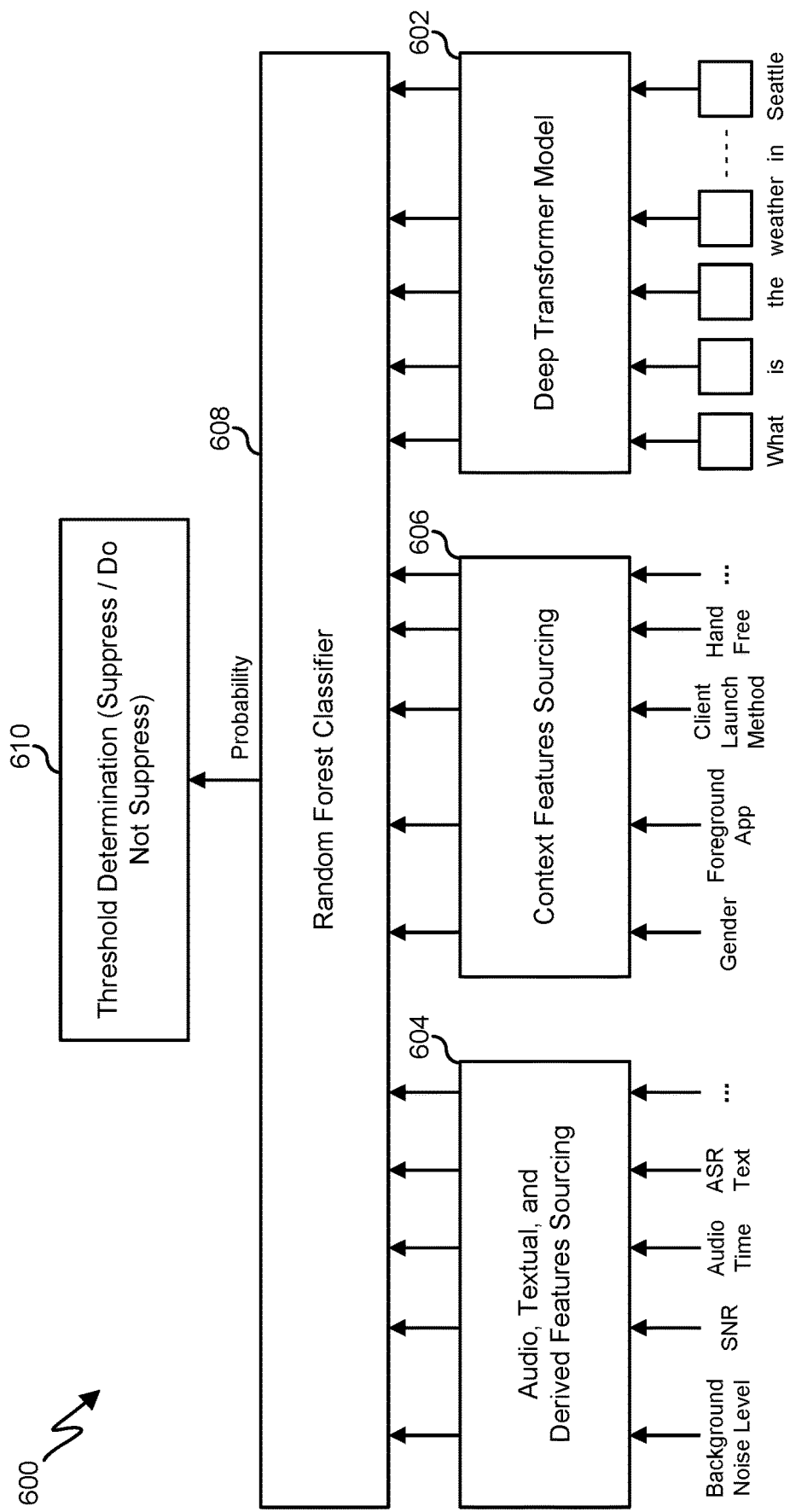
FIG. 6 illustrates another example false wake-up suppression classifier model architecture in accordance with this disclosure.

FIG. 6 illustrates another example of a false wake-up suppression classifier model architecture 600 in accordance with this disclosure. For ease of explanation, the architecture 600 shown in FIG. 6 is described as being implemented on or supported by the electronic device 101 in the network configuration 100 of FIG. 1. However, the architecture 600 shown in FIG. 6 could be used with any other suitable device(s) and in any other suitable system(s), such as when the architecture 600 is implemented on or supported by the server 106.

As shown in FIG. 6, the architecture 600 includes a deep transformer language model 602, such as a BERT model, that receives as an input a text string provided by an ASR model and that corresponds to an input audio signal. The deep transformer language model 602 is trained to assist with providing meaning for language in text using surrounding text to establish context. In embodiments in which the deep transformer language model 602 is a BERT model, the input text can be processed bidirectionally. In this example, the deep transformer language model 602 provides outputs to a random forest classifier 608. The random forest classifier 608 is used to ultimately provide a probability whether an utterance should trigger wake-up procedures or whether wake-up procedures should be suppressed.

In addition to the output received from the deep transformer language model 602, the random forest classifier 608 can receive both audio features and context features. An audio, textual, and derived features sourcing operation 604 collects a plurality of audio features based on or derived from the audio signal and the ASR text, such as an audio time, a signal-to-noise ratio, a background noise level, and other audio features like those described with respect to FIGS. 4A and 4B. In various embodiments, the audio, textual, and derived features sourcing operation 604 can encode these audio features and provide them as additional inputs to the random forest classifier 608. Additionally, sourced audio features such as particular background noises detected in the audio signal can also be used to adjust the probability threshold for wake-up suppression.

Additionally or alternatively, a context features sourcing operation 606 can collect a plurality of context information, such as user gender, a foreground application identification, a client launch method, a hands free setting, or other context information like those described with respect to FIGS. 4A and 4B. In various embodiments, the context features sourcing operation 606 can encode the context features and provide them as additional inputs to the random forest classifier 608. It will be understood that the random forest classifier 608 can include a plurality of decision trees that are to provide multiple probability outputs that are combined, such as via averaging, to provide a final probability regarding whether a wake-up is valid. Based on the output probability, a threshold determination operation 610 determines whether the probability output by the random forest classifier 608 exceeds the threshold. If not, wake-up procedures are suppressed. If so, wake-up procedures are allowed to continue so that the audio input can be further processed for domain/intent detection in order to trigger one or more actions by one or more electronic devices.

Although FIG. 6 illustrates one example of a false wake-up suppression classifier model architecture 600, various changes may be made to FIG. 6. For example, various components and functions in FIG. 6 may be combined, further subdivided, replicated, rearranged, or omitted according to particular needs. Also, one or more additional components and functions may be included if needed or desired. In addition, it will be understood that various types of deep transformer models can be used and that various other types of classification models can be used without departing from the scope of this disclosure.

Figure 7:
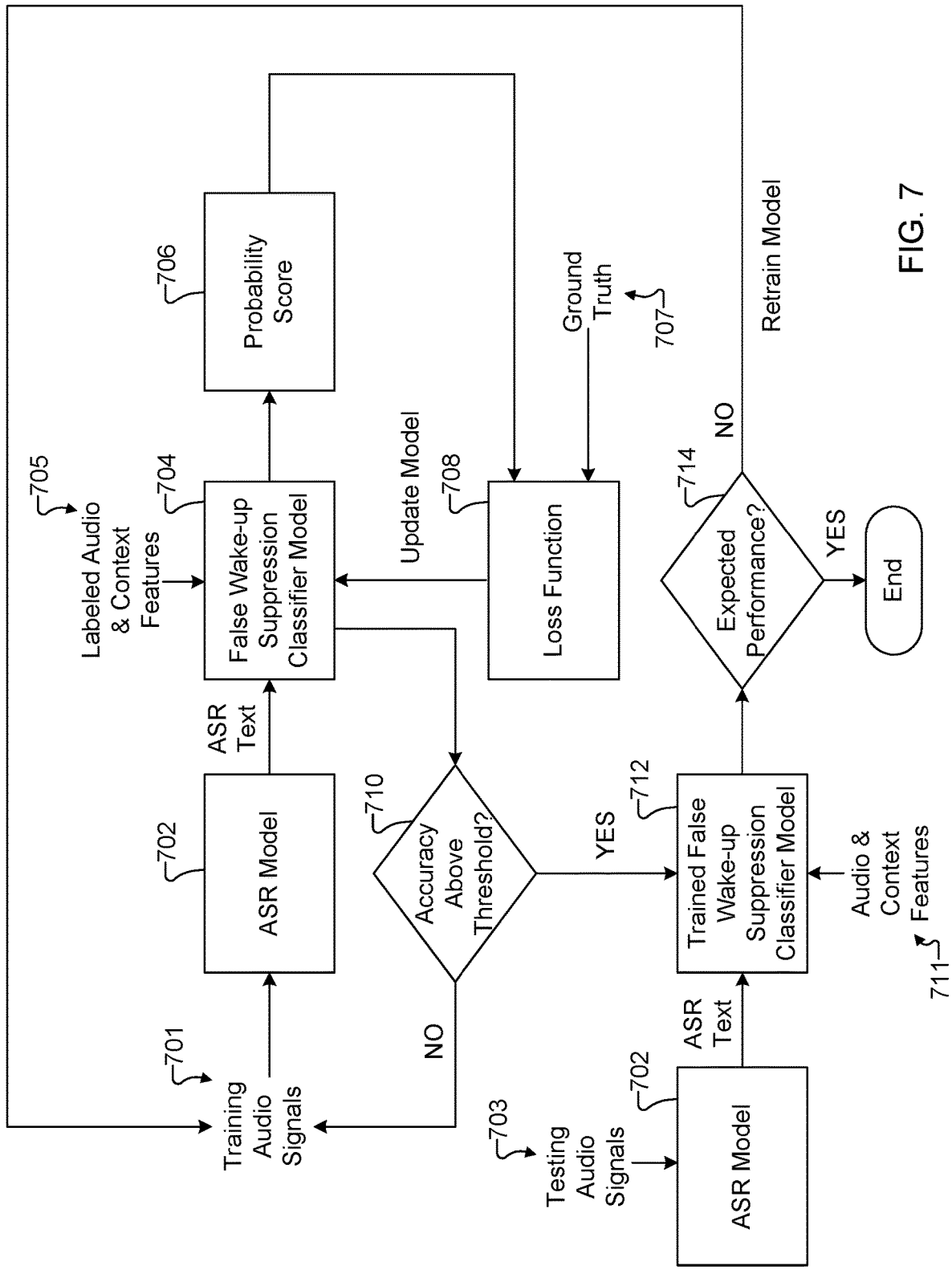
FIG. 7 illustrates an example process for training a false wake-up suppression classifier model in accordance with this disclosure.

FIG. 7 illustrates an example process 700 for training a false wake-up suppression classifier model in accordance with this disclosure. For ease of explanation, the process 700 shown in FIG. 7 is described as being performed using the server 106 in the network configuration 100 of FIG. 1. However, the process 700 may be used with any other suitable device(s), such as the electronic device 101, and in any other suitable system(s).

As shown in FIG. 7, during the process 700, a labeled dataset of audio signals (which in some cases can be human-labeled) is generated and split into a set of training audio signals 701 and a set of testing audio signals 703. The training audio signals 701 are used as inputs to provide an ASR text output using a trained ASR model 702. The ASR text generated from the training audio signals 701 is provided to a false wake-up suppression classifier model 704 that is to be trained under the process 700. Additionally, features derived from base features of the training audio signals 701 are created and labeled, and these labeled audio and context features 705 are used as additional inputs to the false wake-up suppression classifier model 704. Some of the labeled audio and context features 705 that are derived from base features may include total unique words, total stop words, a character-to-audio time ratio, or other features as described with respect to FIGS. 4A and 4B. Using the input ASR text and the input labeled audio and context features 705, the false wake-up suppression classifier model 704 outputs a probability score 706 that is used for predicting and suppressing a false wake-up.

Using the output probability score 706 from the false wake-up suppression classifier model 704, a loss function 708 determines, based on a ground truth 707, an error or loss and modifies or updates the false wake-up suppression classifier model 704 based on the error or loss. For example, when the output of the false wake-up suppression classifier model 704 differs from the ground truth 707, the difference can be used to calculate a loss as defined by the loss function. The loss function may use any suitable measure of loss associated with outputs generated by the false wake-up suppression classifier model 704, such as a cross-entropy loss or a mean-squared error. Based on the calculated loss, parameters of the false wake-up suppression classifier model 704 can be adjusted.

At decision block 710, it is determined whether the initial training of the false wake-up suppression classifier model 704 is complete, such as by determining whether the false wake-up suppression classifier model 704 is predicting false wake-ups using the input training data at an acceptable accuracy level. If not, the process 700 loops back to provide the same or additional training audio samples 701 and the same or additional labeled audio and context features 705 in order to continue training the false wake-up suppression classifier model 704. The process 700 can loop here any number of times to obtain additional outputs from the false wake-up suppression classifier model 704 that are compared to the ground truths so that additional losses can be determined using the loss function 708. Over time, the false wake-up suppression classifier model 704 produces more accurate outputs that more closely match the ground truths, and the measured loss becomes less. The amount of training data used can vary depending on the number of training cycles and may include large amounts of training data. At some point, the measured loss can drop below a specified threshold, and it can be determined at decision block 710 that the desired accuracy is achieved, indicating that the initial training of the false wake-up suppression classifier model 704 is completed. A trained false wake-up suppression classifier model 712 is thus obtained.

As described in this disclosure, the trained false wake-up suppression classifier model 712 can be of various architectures, such as utilizing random forests, deep learned transformers, and/or multi-layer perceptron architectures. It has been found that the various architectures can provide highly-accurate wake-up detection. For example, it has been found that architectures using random forests can provide approximately 93% accuracy or better and architectures using multi-layer perceptrons can provide approximately 96% accuracy or better.

In some embodiments, the trained false wake-up suppression classifier model 712 can be deployed at this point in the process 700. In some embodiments, such as the one shown in FIG. 7, the trained false wake-up suppression classifier model 712 can be tested using the testing audio samples 703. The testing audio samples 703 are provided to the trained ASR model 702, and the ASR text and audio and context features 711 are input to the trained false wake-up suppression classifier model 712. At decision block 714, it is determined whether the trained false wake-up suppression classifier model 712 is performing as expected based on the outputs of the trained false wake-up suppression classifier model 712. It will be understood that multiple tests can be executed and the overall performance of the multiple tests can be evaluated at decision block 714.

Using a testing data set as shown in FIG. 7 can assist with evaluating a machine learning model and confirm the model is working as expected or if a problem has occurred during training, such as if the model overfitted the training data. If the model's performance is not as expected at decision block 714, the process 700 loops back to the beginning of the process 700 to retrain the model (or continue training the model) using the testing data until the expected performance is achieved. Once it is determined that the trained false wake-up suppression classifier model 712 is performing as expected at decision block 714, the process 700 ends, and the trained false wake-up suppression classifier model 712 can be deployed. As a particular example, the process 700 can be executed on the server 106 in the network configuration 100 of FIG. 1, and the trained false wake-up suppression classifier model 712 can be deployed to a client electronic device 101 for use.

Although FIG. 7 illustrates one example of a process 700 for training a false wake-up suppression classifier model, various changes may be made to FIG. 7. For example, while shown as a series of steps, various steps in FIG. 7 could overlap, occur in parallel, occur in a different order, or occur any number of times. Also, in some embodiments, the training audio signals 701 and the testing audio signals 703 may not be provided to the ASR model 702. For instance, rather than relying on the ASR model 702, the labeled audio features can be derived from the training audio signals, and the ASR text can be manually created from the training audio samples and provided to the false wake-up suppression classifier model 704 for training.

Figure 8A:
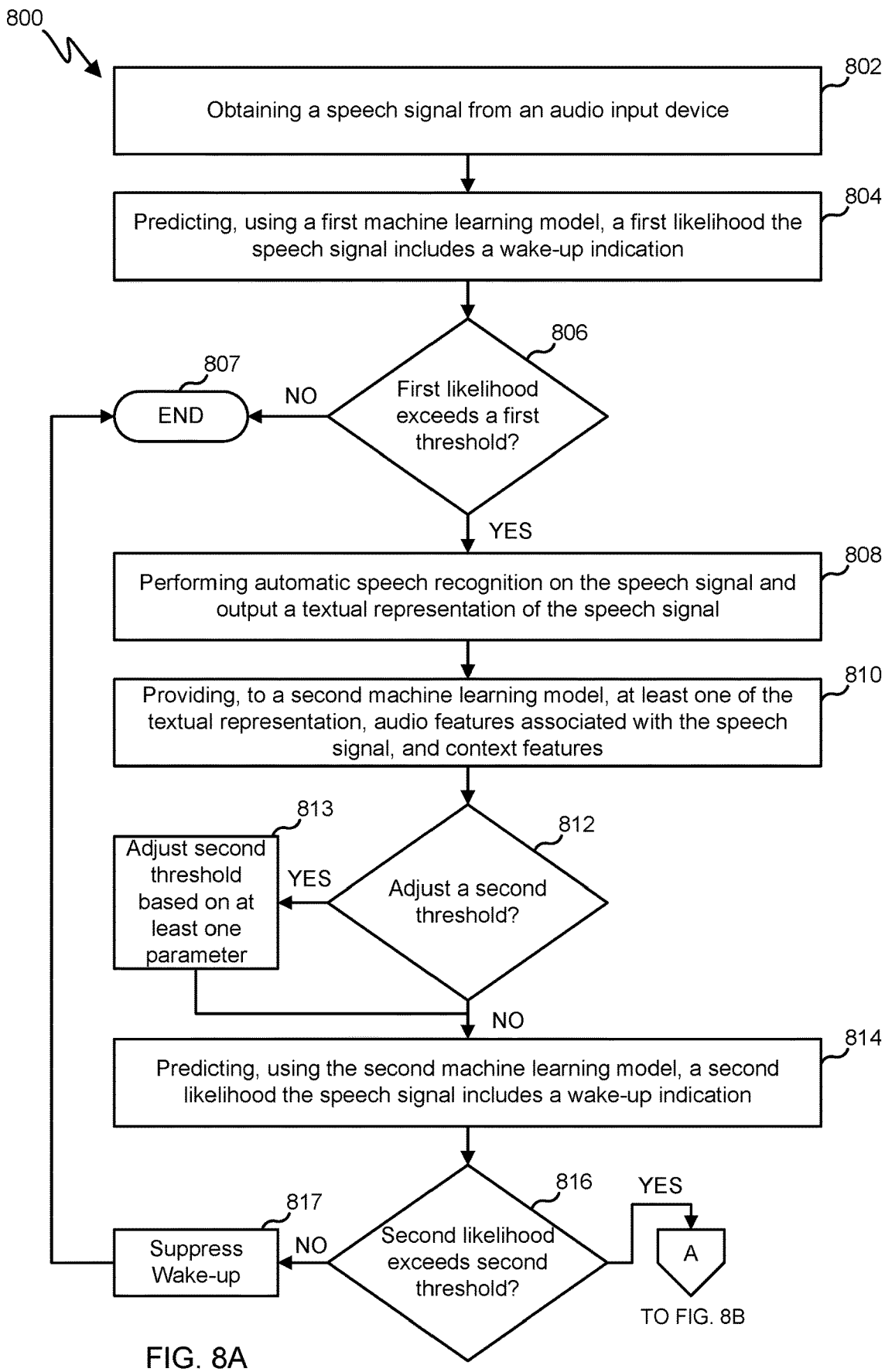
FIGS. 8A and 8B illustrate an example method for false wake-up suppression in accordance with this disclosure.
Figure 8B:
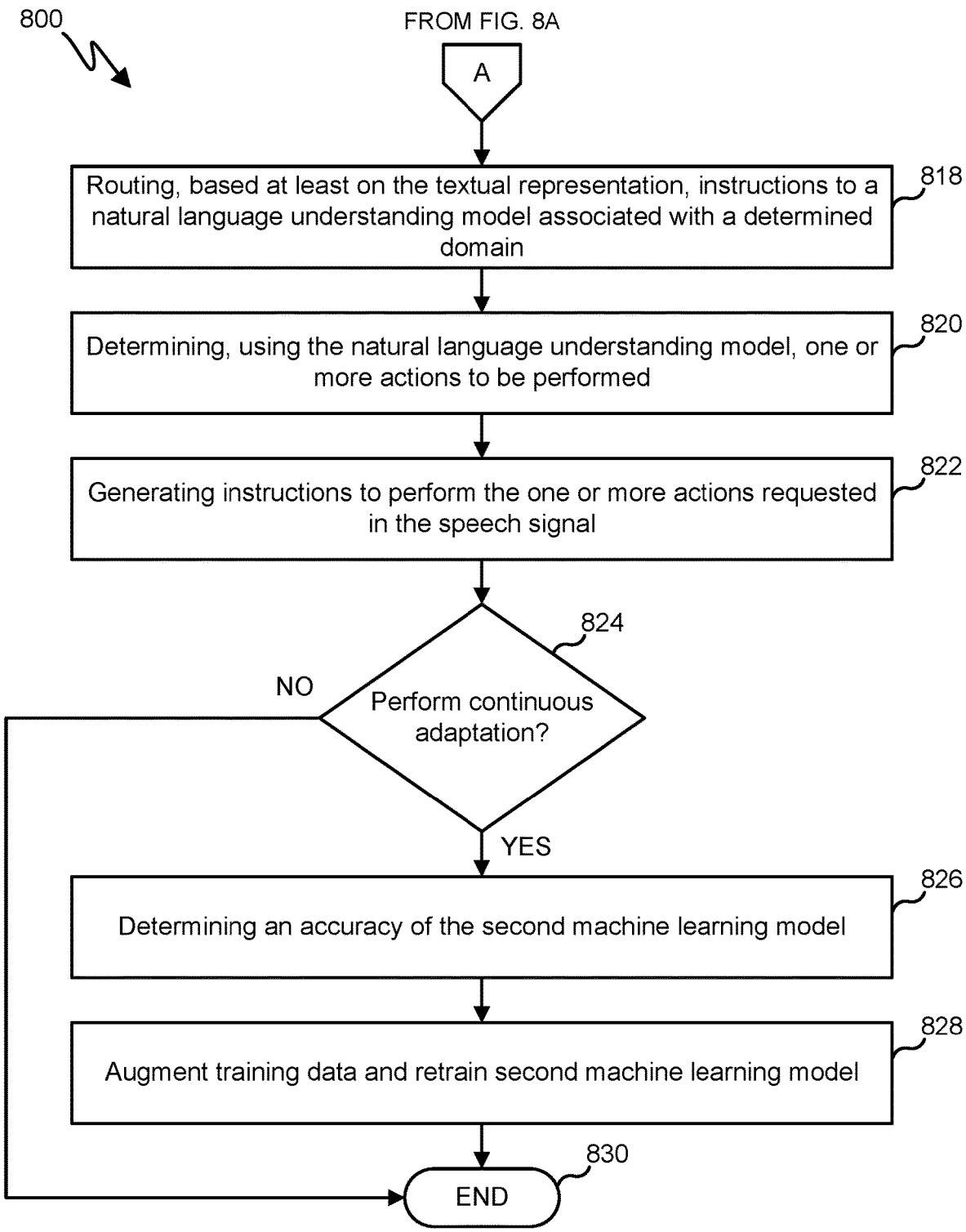

FIGS. 8A and 8B illustrate an example method 800 for false wake-up suppression in accordance with this disclosure. For ease of explanation, the method 800 shown in FIG. 8 is described as being performed by the electronic device 101 in the network configuration 100 of FIG. 1. However, the method 800 shown in FIG. 8 could be used with any other suitable device(s), such as the server 106, and in any other suitable system(s).

As shown in FIG. 8, a speech signal is obtained from an audio input device at step 802. This may include, for example, the processor 120 of the electronic device 101 obtaining audio data from audio input device 206 and storing the obtained audio data at least temporarily in memory. A first likelihood that the speech signal includes a wake-up indication (such as a wake word or other command that triggers voice assistant wake-up procedures) is predicted using a machine learning model at step 804. This may include, for example, the processor 120 of the electronic device 101 using the audio wake-up classifier model 201 to obtain a probability that the speech signal includes a wake-up indication or command from a user. At step 806, it is determined whether the first likelihood exceeds a first threshold. This can include, for example, the processor 120 of the electronic device 101 comparing the probability output by the audio wake-up classifier model 201 to a specified probability threshold and determining whether the probability exceeds the specified threshold. If the first likelihood does not exceed the first threshold, the method 800 ends at step 807. This can include, for example, the processor 120 of the electronic device 101 determining that the first likelihood does not exceed the first threshold and ceasing wake-up procedures since the processor 120 has determined it is unlikely there was an intended wake up command in the speech signal.

If the first likelihood exceeds the first threshold, automatic speech recognition is performed on the speech signal to determine and output a textual representation of the speech signal at step 808. This can include, for example, the processor 120 of the electronic device 101 inputting the speech signal to the ASR model 202 and receiving an ASR text output from the ASR model 202. At least one of the textual representation, audio features associated with the speech signal, and context features are provided to a second machine learning model at step 810. This can include, for example, the processor 120 of the electronic device 101 sourcing the ASR text output and the audio features using the audio, textual, and derived features sourcing operation 604, sourcing context features using the context features sourcing operation 606, and inputting the ASR text, the audio features, and/or the context features into the false wake-up suppression classifier model 204. In some embodiments, the textual representation can be a partial ASR output, such as if the ASR model 202 is configured to output a text stream. The audio features can include at least one of a bag of words, a total word count, a total character count, a unique word count, a stop word count, an audio time, a signal-to-noise ratio, and other audio features, such as those described with respect to FIGS. 4A and 4B. The context features can include one or more of at least one user characteristic, a launch method, foreground application information, and other context features, such as those described with respect to FIGS. 4A and 4B.

It is determined whether to adjust a second threshold at step 812. This can include, for example, the processor 120 of the electronic device 101 determining whether to adjust the second threshold based on one or more parameters such as an accuracy of the first machine learning model and/or based on one or more of the audio or context features. If the second threshold is not to be adjusted, the method 800 moves to step 814. If the second threshold is to be adjusted, the method 800 moves to step 813. The second threshold is adjusted based on at least one parameter at step 813. For example, the processor 120 can determine a background noise environment associated with the speech signal and set the second threshold based on the determined background noise environment. As another example, the processor 120 can determine an accuracy of the first machine learning model used to predict the first likelihood based on a plurality of previous speech signals and adjust the second threshold lower or higher based on the determined accuracy. The method 800 then moves to step 814.

A second likelihood the speech signal includes a wake-up indication is predicted using the second machine learning model at step 814. This can include, for example, the processor 120 of the electronic device 101 using the false wake-up suppression classifier model 204 to obtain a second probability that the speech signal includes a wake-up indication or command from a user. Here, the false wake-up suppression classifier model 204 can use the textual representation, the audio features associated with the speech signal, and the context features associated with the electronic device. For instance, to obtain the second likelihood, natural language processing can be performed on the textual representation using a deep transformer model included in the second machine learning model, and one or more results can be output. The one or more results of the natural language processing, along with the audio features and the context features, can be provided to a multi-layer perceptron model of the second machine learning model, and an output pertaining to the second likelihood can be received from the multi-layer perceptron model indicating whether or not to suppress a wake-up operation of a voice assistant. As another example, to obtain the second likelihood, natural language processing can be performed on the textual representation using a deep transformer model included in the second machine learning model, and one or more results can be output. The one or more results of the natural language processing, along with the audio features and the context features, can be provided to a random forest classifier model of the second machine learning model, and an output pertaining to the second likelihood can be received from the random forest classifier model indicating whether or not to suppress a wake-up operation of a voice assistant.

It is determined whether the second likelihood exceeds the second threshold at step 816. This can include, for example, the processor 120 of the electronic device 101 comparing the probability output by the false wake-up suppression classifier model 204 to a specified threshold value. If the probability is lower than the specified threshold value, wake-up procedures are suppressed at step 817, and the method 800 end at step 807. If the probability exceeds the specified threshold value, wake-up procedures may continue by moving to step 818.

Instructions are routed based on the textual representation to a natural language understanding model associated with a determined domain at step 818. This can include, for example, the processor 120 of the electronic device 101 using the router 308 to determine which domain(s) and associated application(s) are to be used for the one or more commands in the utterance. At step 820, one or more actions to be performed are determined using the natural language understanding model that the process was routed to at step 818. This can include, for example, the processor 120 of the electronic device 101 using an NLU model 310 associated with the domain(s), sub-assistant(s), and/or application(s) to identify one or more actions to be performed by the electronic device 101 or another electronic device. Instructions are generated to perform the one or more determined actions requested in the speech signal at step 822. This can include, for example, the processor 120 of the electronic device 101 creating commands for one or more applications to perform in order to satisfy the requests in the user utterance, such as starting a timer, playing a song, performing navigation to a location, etc.

It is determined whether to perform continuous adaptation at step 824. This can include, for example, the processor 120 of the electronic device 101 determining if the false wake-up suppression classifier model 204 has an associated setting or parameter to perform continuous learning operations. If not, the method 800 ends at step 830. Otherwise, at step 826, an accuracy of the second machine learning model is determined. This can include, for example, the processor 120 of the electronic device 101 using verified heuristics to continuously or repeatedly identify correct wake-up and false wake-up utterances after the false wake-up suppression classifier model 204 has been deployed to improve the false wake-up suppression classifier model 204. To continuously improve the second machine learning model, training data is augmented, and the second machine learning model is retrained using the augmented training data. This can include, for example, the processor 120 of the electronic device 101 augmenting the training data, retraining the false wake-up suppression classifier model 204 using the augmented training data, and providing an updated false wake-up suppression classifier model 204 for further use. The method 800 ends at step 830.

Although FIG. 8 illustrates one example of a method 800 for false wake-up suppression, various changes may be made to FIG. 8. For example, while shown as a series of steps, various steps in FIG. 8 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
obtaining, by at least one processing device of an electronic device, a speech signal;
predicting, by the at least one processing device, a first likelihood of a wake word or phrase being spoken in the speech signal using a first machine learning model trained to receive the speech signal as input;
responsive to the first likelihood exceeding a first threshold, performing, by the at least one processing device, automatic speech recognition on the speech signal to determine a textual representation of the speech signal;
predicting, by the at least one processing device, a second likelihood of the wake word or phrase being spoken in the speech signal using a second machine learning model trained to receive at least one of the textual representation, audio features associated with the speech signal, and context features associated with the electronic device;
responsive to the second likelihood exceeding a second threshold, generating, by the at least one processing device, instructions to perform an action requested in the speech signal;
determining, by the at least one processing device, an accuracy of the first machine learning model used to predict the first likelihood using a plurality of previous speech signals; and
updating, by the at least one processing device, the second threshold based on the determined accuracy.

2. The method of claim 1, wherein predicting the second likelihood using the second machine learning model includes:
performing, by the at least one processing device, natural language processing on the textual representation using a deep transformer model included in the second machine learning model and outputting one or more results;
providing, by the at least one processing device to a multi-layer perceptron model of the second machine learning model, the one or more results of the natural language processing, the audio features, and the context features; and
receiving, by the at least one processing device, an output from the multi-layer perceptron model indicating whether or not to suppress a wake-up operation of a voice assistant.

3. The method of claim 1, wherein predicting the second likelihood using the second machine learning model includes:
performing, by the at least one processing device, natural language processing on the textual representation using a deep transformer model included in the second machine learning model and outputting one or more results;
providing, by the at least one processing device to a random forest classifier model of the second machine learning model, the one or more results of the natural language processing, the audio features, and the context features; and
receiving, by the at least one processing device, an output from the random forest classifier model indicating whether or not to suppress a wake-up operation of a voice assistant.

4. The method of claim 1, further comprising:
determining, by the at least one processing device, a background noise environment associated with the speech signal; and
setting the second threshold based on the determined background noise environment.

5. The method of claim 1, wherein the audio features include at least one of: a bag of words, a total word count, a total character count, a unique word count, a stop word count, an audio time, and a signal-to-noise ratio.

6. The method of claim 1, wherein the context features include at least one of: at least one user characteristic, a launch method, and foreground application information.

7. The method of claim 4, wherein:
determining the background noise environment associated with the speech signal includes determining that the background noise environment is associated with an environment in which use of a voice assistant is likely; and setting the second threshold based on the determined background noise environment includes decreasing the second threshold.

8. An electronic device comprising:
at least one processing device configured to:
  obtain a speech signal;
  predict a first likelihood of a wake word or phrase being spoken in the speech signal using a first machine learning model trained to receive the speech signal as input;
  responsive to the first likelihood exceeding a first threshold, perform automatic speech recognition on the speech signal to determine a textual representation of the speech signal;
  predict a second likelihood of the wake word or phrase being spoken in the speech signal using a second machine learning model trained to receive at least one of the textual representation, audio features associated with the speech signal, and context features associated with the electronic device;
  responsive to the second likelihood exceeding a second threshold, generate instructions to perform an action requested in the speech signal;
  determine an accuracy of the first machine learning model used to predict the first likelihood using a plurality of previous speech signals; and
  update the second threshold based on the determined accuracy.

9. The electronic device of claim 8, wherein, to predict the second likelihood using the second machine learning model, the at least one processing device is configured to:
  perform natural language processing on the textual representation using a deep transformer model included in the second machine learning model and outputting one or more results;
  provide, to a multi-layer perceptron model of the second machine learning model, the one or more results of the natural language processing, the audio features, and the context features; and
  receive an output from the multi-layer perceptron model indicating whether or not to suppress a wake-up operation of a voice assistant.

10. The electronic device of claim 8, wherein, to predict the second likelihood using the second machine learning model, the at least one processing device is configured to:
  perform natural language processing on the textual representation using a deep transformer model included in the second machine learning model and outputting one or more results;
  provide, to a random forest classifier model of the second machine learning model, the one or more results of the natural language processing, the audio features, and the context features; and
  receive an output from the random forest classifier model indicating whether or not to suppress a wake-up operation of a voice assistant.

11. The electronic device of claim 8, wherein the at least one processing device is further configured to:
  determine a background noise environment associated with the speech signal; and
  set the second threshold based on the determined background noise environment.

12. The electronic device of claim 8, wherein the audio features include at least one of: a bag of words, a total word count, a total character count, a unique word count, a stop word count, an audio time, and a signal-to-noise ratio.

13. The electronic device of claim 8, wherein the context features include at least one of: at least one user characteristic, a launch method, and foreground application information.

14. The electronic device of claim 11, wherein;
  to determine the background noise environment associated with the speech signal, the at least one processing device is configured to determine that the background noise environment is associated with an environment in which use of a voice assistant is likely; and
  to set the second threshold based on the determined background noise environment, the at least one processing device is configured to decrease the second threshold.

15. A non-transitory machine readable medium containing instructions that when executed cause at least one processor of an electronic device to:
  obtain a speech signal;
  predict a first likelihood of a wake word or phrase being spoken in the speech signal using a first machine learning model trained to receive the speech signal as input;
  responsive to the first likelihood exceeding a first threshold, perform automatic speech recognition on the speech signal to determine a textual representation of the speech signal;
  predict a second likelihood of the wake word or phrase being spoken in the speech signal using a second machine learning model trained to receive at least one of the textual representation, audio features associated with the speech signal, and context features associated with the electronic device;
  responsive to the second likelihood exceeding a second threshold, generate instructions to perform an action requested in the speech signal;
  determine an accuracy of the first machine learning model used to predict the first likelihood using a plurality of previous speech signals; and
  update the second threshold based on the determined accuracy.

16. The non-transitory machine readable medium of claim 15, wherein the instructions that when executed cause the at least one processor to predict the second likelihood using the second machine learning model comprise instructions that when executed cause the at least one processor to:
  perform natural language processing on the textual representation using a deep transformer model included in the second machine learning model and outputting one or more results;
  provide, to a multi-layer perceptron model of the second machine learning model, the one or more results of the natural language processing, the audio features, and the context features; and
  receive an output from the multi-layer perceptron model indicating whether or not to suppress a wake-up operation of a voice assistant.

17. The non-transitory machine readable medium of claim 15, wherein the instructions that when executed cause the at least one processor to predict the second likelihood using the second machine learning model comprise instructions that when executed cause the at least one processor to:
  perform natural language processing on the textual representation using a deep transformer model included in the second machine learning model and outputting one or more results;

provide, to a random forest classifier model of the second machine learning model, the one or more results of the natural language processing, the audio features, and the context features; and receive an output from the random forest classifier model indicating whether or not to suppress a wake-up operation of a voice assistant.

18. The non-transitory machine readable medium of claim 15, further containing instructions that when executed cause the at least one processor to:

determine a background noise environment associated with the speech signal; and set the second threshold based on the determined background noise environment.

19. The non-transitory machine readable medium of claim 15, wherein the audio features include at least one of: a bag of words, a total word count, a total character count, a unique word count, a stop word count, an audio time, and a signal-to-noise ratio.

20. The non-transitory machine readable medium of claim 15, wherein the context features include at least one of: at least one user characteristic, a launch method, and foreground application information.

* * * * *